United States Patent
Szeto

(10) Patent No.: US 9,488,351 B1
(45) Date of Patent: Nov. 8, 2016

(54) SYSTEM AND METHOD FOR REPLACING FLUORESCENT BULBS WITH LED LIGHTS IN A CEILING FIXTURE WITH A METAL TROFFER

(71) Applicant: Oliver Szeto, Bristol, PA (US)

(72) Inventor: Oliver Szeto, Bristol, PA (US)

(*) Notice: Subject to any disclaimer, the term of this patent is extended or adjusted under 35 U.S.C. 154(b) by 300 days.

(21) Appl. No.: 14/449,315

(22) Filed: Aug. 1, 2014

Related U.S. Application Data

(63) Continuation-in-part of application No. 13/569,437, filed on Aug. 8, 2012, now abandoned, which is a continuation-in-part of application No. 13/245,809, filed on Sep. 26, 2011, now Pat. No. 8,727,566.

(51) Int. Cl.
   *F21V 23/00* (2015.01)
   *F21V 29/00* (2015.01)

(52) U.S. Cl.
   CPC .............. *F21V 23/005* (2013.01); *F21V 29/00* (2013.01)

(58) Field of Classification Search
   CPC .......... F21V 1/00; F21V 5/04; F21V 23/005; F21V 29/00
   See application file for complete search history.

(56) References Cited

U.S. PATENT DOCUMENTS

| | | | | |
|---|---|---|---|---|
| 8,579,467 B1* | 11/2013 | Szeto | ........................ | F21V 5/04 362/246 |
| 8,727,566 B1* | 5/2014 | Szeto | ..................... | F21S 8/026 29/825 |
| 2007/0081342 A1* | 4/2007 | Szeto | ........................ | F21K 9/00 362/294 |

* cited by examiner

*Primary Examiner* — Stephen F Husar
(74) *Attorney, Agent, or Firm* — LaMorte & Associates, P.C.

(57) ABSTRACT

A system and method of converting a light fixture from a conventional light fixture to an LED light fixture. Originally, the light fixture has a sheet metal troffer, a power supply, and receptacles for retaining bulbs. The conversion is accomplished in the following manner. A circuit board assembly is provided that has a plurality of LEDs mounted thereon. An LED power supply is also provided. The original power supply is replaced with the LED power supply. The circuit board assembly is directly mounted to the sheet metal troffer, which acts as a heat sink.

19 Claims, 6 Drawing Sheets

SYSTEM AND METHOD FOR REPLACING FLUORESCENT BULBS WITH LED LIGHTS IN A CEILING FIXTURE WITH A METAL TROFFER

RELATED APPLICATION

This application is a continuation-in-part of U.S. patent application Ser. No. 13/569,437, filed Aug. 8, 2012, which is a continuation-in-part of U.S. patent application Ser. No. 13/245,809, filed Sep. 26, 2011, now U.S. Pat. No. 8,727,566.

BACKGROUND OF THE INVENTION

1. Field of the Invention

In general, the present invention relates to ceiling/overhead lighting fixtures that utilize sheet metal troffers. More particularly, the present invention relates to systems and methods that retroactively add LED lights to the structure of a lighting fixture that previously held a fluorescent bulb or an incandescent bulb.

2. Prior Art Description

Light emitting diodes (LEDs) are becoming more powerful with each successive generation. At the same time, the costs associated with manufacturing LEDs has been decreasing. LEDs have now evolved to a point where a small matrix of LEDs can produce just as much light as an incandescent bulb or a fluorescent bulb. As an example, a small matrix of LEDs that uses less than ten watts during operation can give off more light than a 100-watt incandescent bulb or a 40-watt fluorescent tube.

LEDs are far more energy efficient than either incandescent bulbs or fluorescent bulbs. Furthermore, LEDs have a much longer life span and are far more resistant to damage than are incandescent bulbs and fluorescent bulbs. For these reasons, many companies would like to replace traditional incandescent light bulbs and fluorescent bulbs with LED lighting. However, a problem that occurs is that in many offices, general lighting is installed as ceiling/overhead fixtures that can only retain fluorescent tube lighting. The ceiling/overhead fixtures are either set into the structure of drop ceiling tiles or are suspended from the structure of the ceiling.

Ceiling/overhead fixtures typically have sheet metal troffers that receive and hold florescent tubes. In order to replace the florescent tubes with LED lights, either the ceiling/overhead fixtures have to be replaced, or the ceiling/overhead fixtures have to be modified to receive and power a matrix of LEDs.

Replacing existing ceiling/overhead fixtures is a very expensive and labor intensive endeavor that may require the ceiling tiles surrounding the troffers be replaced. This solution is very expensive and it would take many years for the cost savings of the LED lights to pay for the cost of the lighting change. As a consequence, outside of new construction, there is no commercial significant market for LED lighting fixtures that replace fluorescent tube troffers.

An alternative approach is to convert existing fluorescent ceiling troffers into receptacles for LED matrices. In order to convert a fluorescent light troffer into an appropriate LED receptacle, certain modifications of the troffer must be made. In the prior art, there exist some conversion systems. An exemplary system is the Tempr™ T8LED conversion kit sold by Albeo Technologies of Boulder, Colo. Using such prior art conversion systems, first the power supply and supply wiring within the troffer are replaced. Second, the receptacles that hold the fluorescent tube lights are removed. Third, a long heavy heat sink is screw mounted into the base of the troffer. Lastly, an LED matrix is mounted to the heat sink using mechanical fasteners. Such conversion kits sell in excess of $500 per troffer and require substantial labor to install. Consequently, many companies that would like to convert to LED lighting do not find it cost effective to change from the existing fluorescent tube lighting.

A need therefore exists for a system and method of converting a fluorescent light ceiling fixture into an LED fixture at a lower cost and using less labor than is required by existing conversion systems. In this manner, more businesses and homes will find it cost effective to convert to LED lighting, therein reducing power consumption and the corresponding drain on natural resources. This need is met by the present invention as described and claimed below.

SUMMARY OF THE INVENTION

The present invention is a system and method of converting a light fixture from a conventional light fixture into an LED light fixture. Originally, the light fixture has a sheet metal troffer, a conventional power supply, and receptacles for retaining either fluorescent or incandescent bulbs.

A circuit board substrate is provided that has a forward surface disposed between two long side edges. The circuit board is affixed to the interior surface of the metal troffer. As such, the metal troffer serves as a heat sink for the circuit board substrate.

A plurality of light emitting diodes are mounted on the forward surface of the circuit board substrate. If the light fixture originally had exposed fluorescent tube lights, a semi-tubular diffuser is positioned over the circuit board substrate. The semi-tubular diffuser covers the light emitting diodes on the circuit board substrate and diffuses light produced by the plurality of light emitting diodes.

If the light fixture originally had a planar diffuser that prevented the fluorescent tube lights from being directly observed, then a supplemental diffuser can be placed over the original planar diffuser. This further diffuses light and causes the LEDs to have the same appearance as a fluorescent tube light.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system can be embodied in many ways, the embodiment illustrated shows the system being used to retrofit a traditional 24 inch by 48 inch sheet metal ceiling troffer that was originally designed to hold four fluorescent tubes. Such ceiling troffers are most commonly utilized in the United States. Accordingly, the embodiment is selected in order to set forth the best mode contemplated for the invention. The illustrated embodiment, however, is merely exemplary and should not be considered a limitation when interpreting the scope of the appended claims. It will be understood that the present invention can be applied to ceiling troffers of many different sizes.

Figure 1:
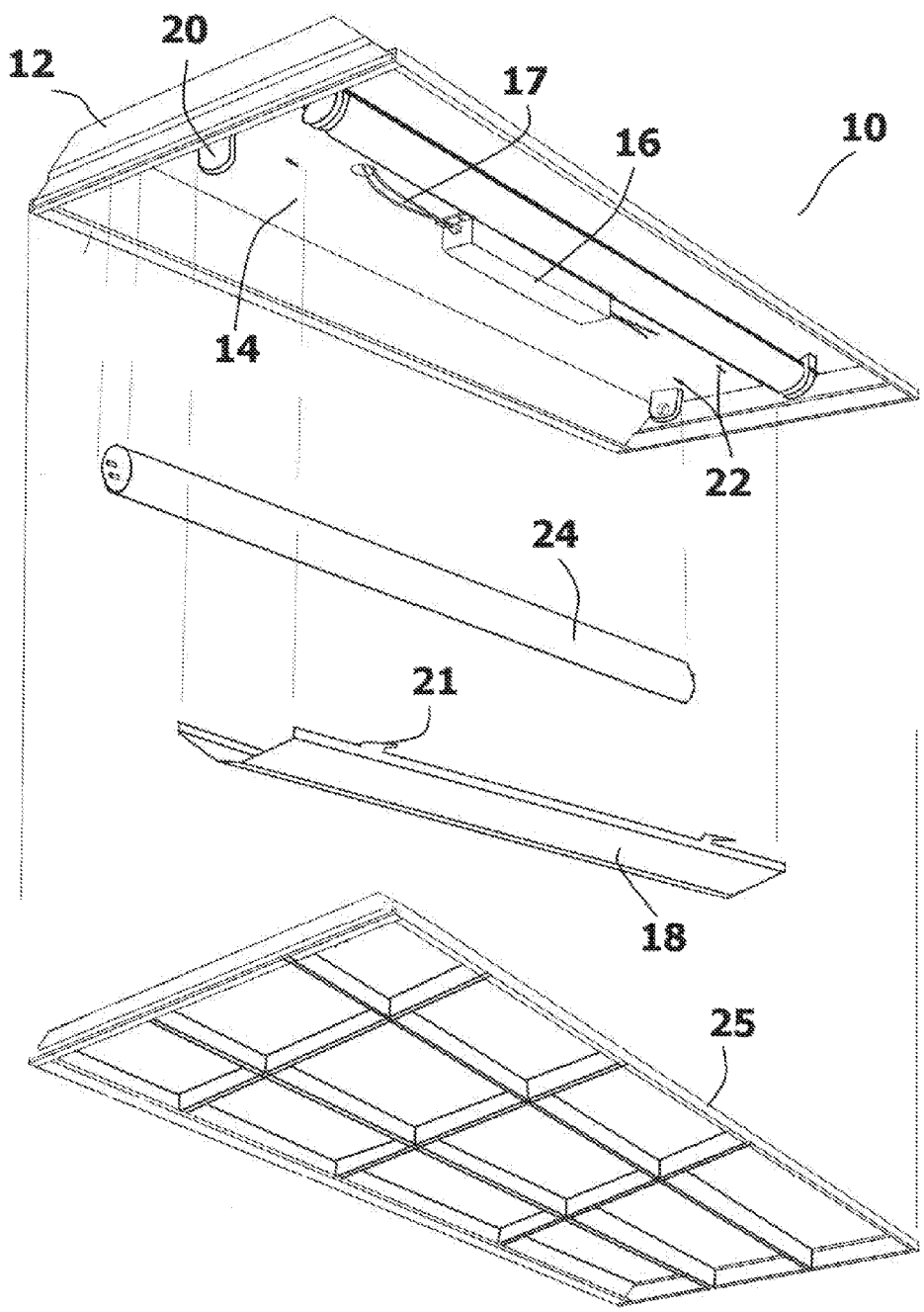
FIG. 1 is a perspective view of a prior art lighting fixture having a sheet metal troffer.

Referring to FIG. 1, a prior art light fixture 10 is shown. The light fixture 10 has a sheet metal troffer 12 that is mounted to a dropped ceiling. The troffer 12 has a flat bottom interior surface 14.

A power supply 16 and associated wiring 17 is disposed behind a formed metal cover 18 that is mounted to the center of the flat bottom interior surface 14 of the troffer 12. Normally, the power supply 16 and wiring 17 cannot be seen unless the metal cover 18 is removed. The metal cover 18 typically engages the troffer 12 using interlocking tabs 21 and slots 22. Accordingly, the metal cover 18 can be removed without the use of tools.

Receptacle posts 20 are mounted to the troffer 12 at opposite ends of the bottom interior surface 14. The receptacle posts 20 contain the electrical contacts that provide power to the florescent tube lights 24. The receptacle posts 20 are spaced to match the predetermined length of the fluorescent tube lights 24, wherein the receptacle posts 20 retain the fluorescent tube lights 24 in fixed positions.

The light produced by the fluorescent tube lights 24 passes through a face panel 25. The face panel 25 is mounted to the troffer 12 over the fluorescent tube lights 24. In the embodiment of FIG. 1, the face panel 25 enables the fluorescent tube lights 24 to be directly observed by a person looking at the light fixture 10.

Figure 2:
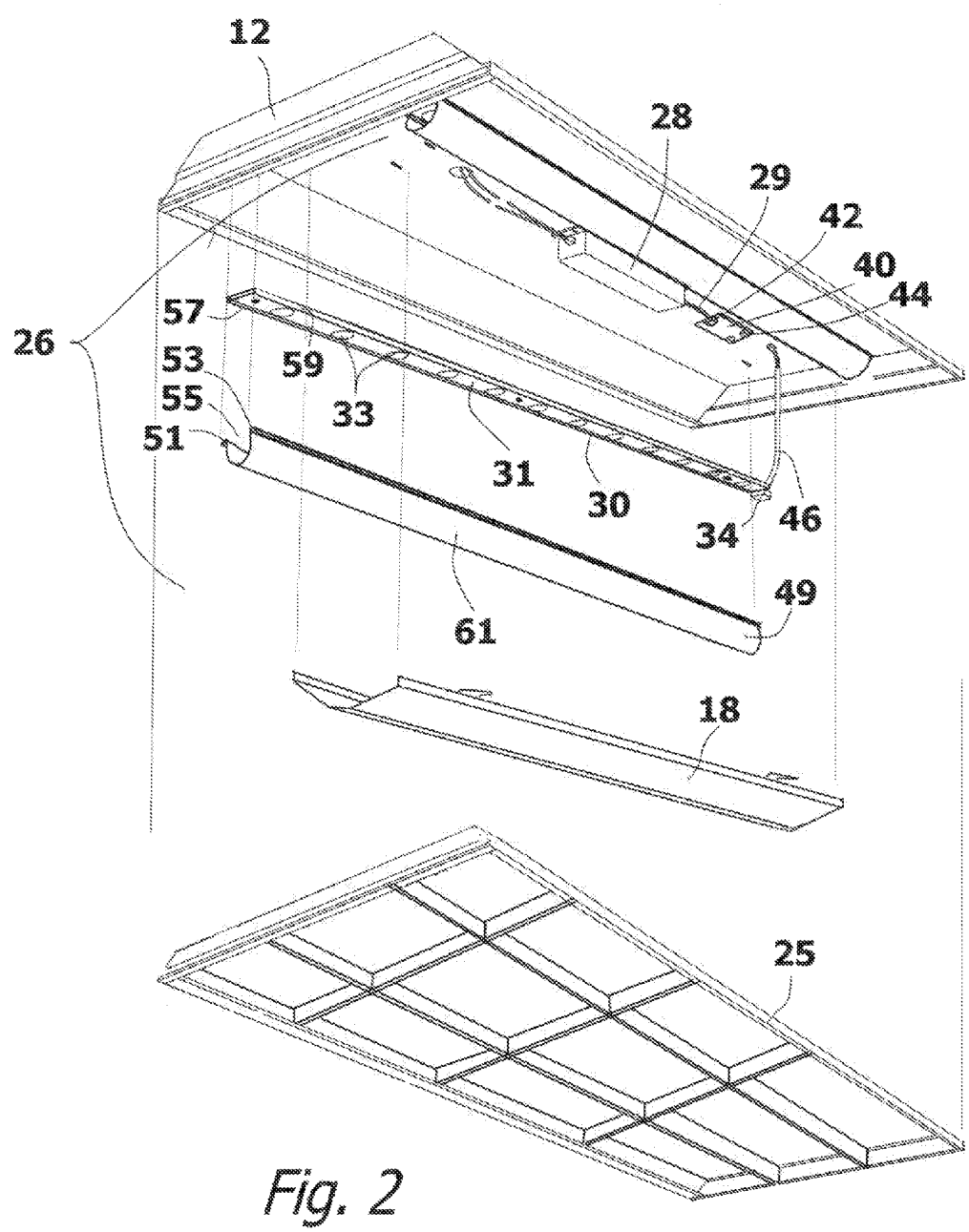
FIG. 2 is an exploded perspective view of a converted light fixture utilizing the sheet metal troffer of FIG. 1.
Figure 3:
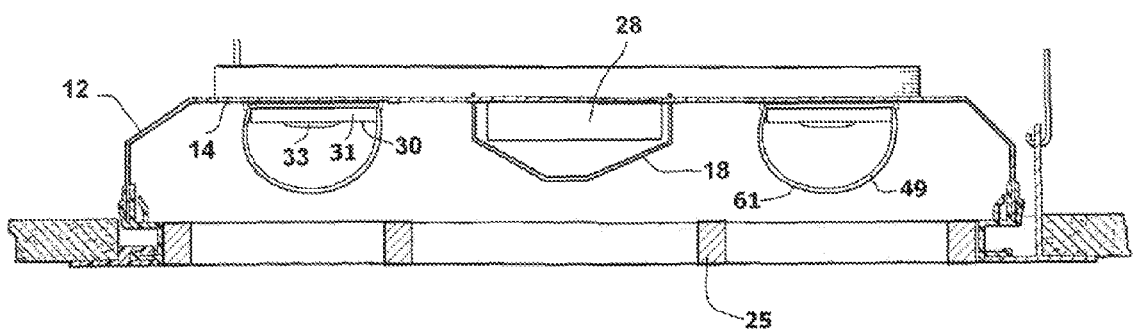
FIG. 3 is a cross-sectional view of the converted light fixture of FIG. 2.

Referring to FIG. 2 and FIG. 3, in conjunction with FIG. 1, it can be seen that in order to prepare the prior art lighting fixture 10 for conversion, the face panel 25 is removed, as are the fluorescent tube lights 24. The metal cover 18 is removed, as are the original power supply 16 and wiring 17. The receptacle posts 20 can be removed if desired, but need not be.

The present invention conversion system 26 includes a new LED power supply 28. A connector board 40 is also provided. The connector board 40 includes an input connector port 42 and multiple output connector ports 44. The LED power supply 28 connects to the input connector 42 of the connector board 40 using a first wiring cable 29. The circuit pathways on the connector board 40 distribute the power from the LED power supply 28 to the various output connector ports 44.

A plurality of circuit board assemblies 30 are provided. In the illustrated embodiment, two circuit board assemblies 30 are shown. However, any number of circuit board assemblies 30 can be used to mimic the lighting profile of a particular fluorescent or incandescent lighting fixture. On the connector board 40, an output connector port 44 is provided for each of the circuit board assemblies 30.

Each of the circuit board assemblies 30 contains a circuit board substrate 31 upon which are mounted one or more matrices of LEDs 33. The LEDs 33 are preferably linearly aligned along the length of the circuit board assembly 30. Each circuit board assembly 30 has a length which is approximately the same length as the fluorescent tube lights 24 originally used. An electrical connector 34 is provided on each of the circuit board assemblies 30 for use in connecting the circuit board assemblies 30 to available output connector ports 44 on the connector board 40. Flexible wiring cables 46 are used to interconnect the circuit board assemblies 30 to the connector board 40.

A mechanical and/or adhesive connector is used to hold the circuit board assemblies 30 in place. The preferred connectors are later discussed in detail. The connectors hold the circuit board substrate 31 in thermal contact with the troffer 12 so that the circuit board assemblies 30 can exchange heat with the troffer 12. The troffer 12 is fabricated from sheet metal. The metal of the troffer 12 acts as a heat sink that absorbs heat from the circuit board substrate 31 and transfers that heat to the sheet metal of the troffer 12. Due to the large surface area of the troffer 12 in relation to the relatively small area of the circuit board substrate 31, enough heat is transferred to keep the circuit board assemblies 30 within their operating temperature specifications even during the most unfavorable ambient conditions.

Once the circuit board assemblies 30 are affixed in place, the flexible cables 46 are used to connect the circuit board assemblies 30 to the connector board 40. The metal cover 18 is returned to its installed position on the troffer 12, and LEDs 33 are ready to be activated.

Since multiple LEDs 33 are positioned on each circuit board substrate 31, the LEDs 33 produce specific concentrated points of light when activated. These multiple points of light have a different appearance from the even light produced along the length of a traditional fluorescent tube. In order to soften and blend the light of the LEDs 33, a semi-tubular diffuser 49 is used.

Each semi-tubular diffuser 49 is made from an extruded length of translucent plastic. The plastic can merely be clouded. However, the translucent plastic preferably has lenticular and/or prismatic features to help diffuse the light produced by the LEDs 33. The semi-tubular diffuser 49 has a cross-sectional profile that has a shape of the Greek letter omega. That is, the semi-tubular diffuser 49 has a curved shape with two edges 51, 53 and an open space 55 that separates the two edges 51, 53. The semi-tubular diffuser 49 has a curved exterior 61 with a radius of between ¼ inched and 1 inch so as to mimic the curved appearance of a traditional fluorescent tube.

Grooves 55 are formed in the semi-tubular diffuser 49 proximate each of the two edges 51, 53. Each of the grooves 55 is sized to receive opposite side edge 57, 59 of the circuit board substrate 31 with a snap-fit. The distance between the grooves 55 is equal to, or just slightly shorter than, the width of the circuit board substrate 31 between its two side edges 57, 59. Consequently, when the circuit board substrate 31 connects to the grooves 55, the semi-tubular diffuser 49 is slightly spread and clamps into the circuit board substrate 31 with a slight spring bias.

The LEDs 33 extend across a range of the circuit board substrate 31. Each semi-tubular diffuser 49 is at least as long as the range of the LEDs 33 on the circuit board substrate 31. As such, when a person looks at the light fixture 10, they do not see the LEDs 33 on the circuit board assemblies 30. Rather, all they see is the curved exterior of the semi-tubular diffuser 49. The curved exterior of the semi-tubular diffuser 49 that is visible presents an appearance very similar to that of a traditional fluorescent tube bulb. Thus, a person viewing the semi-tubular diffuser 49 will be presented with the same view as if they were viewing a traditional fluorescent tube bulb. This enables the open face panel 25 to be used on the light fixture 10, even though such a face panel 25 leaves visible portions of the fluorescent tube bulbs.

The use of an open face panel 25 is optional. Accordingly, the use of the semi-tubular diffuser 49 is also optional.

Figure 4:
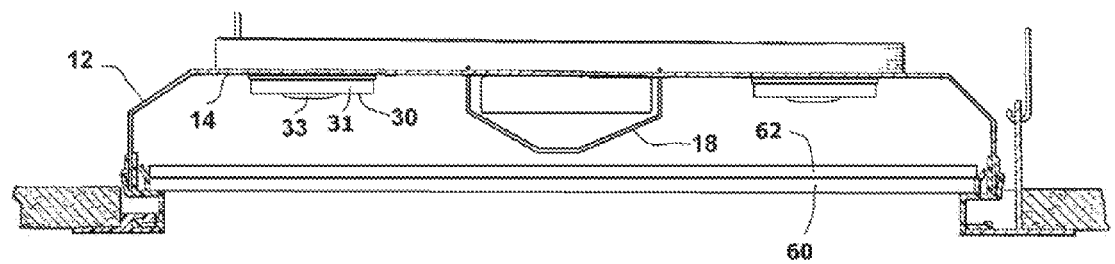
FIG. 4 is a cross-sectional view of the converted light fixture of FIG. 2 shown using supplemental planar diffusers in place of a semi-tubular diffuser.

Referring to FIG. 4, the lighting fixture 10 is shown that is joined with a traditional planar diffuser 60 that hangs at the bottom of the troffer 12. The planar diffuser 60 is prismatic in nature, as is typically used for fluorescent bulb light fixtures. However, traditional prismatic diffuser panels lack the ability to adequately diffuse the bright light emitted by the LEDs sufficiently enough to avoid the appearance of bright spots. To assist the existing prismatic planar diffuser 60, an auxiliary lenticular panel 62 is placed flat against the planar prismatic diffuser 60. The supplemental lenticular diffuser 62 preferably has a diffusion pattern of at least 40 lines per inch (LPI). The supplemental lenticular diffuser 62 can be loosely placed atop the planar prismatic diffuser 60. However, it is preferred that the supplemental lenticular diffuser 62 be adhered to the planar prismatic diffuser 60 for alignment purposes. The lenticular diffuser 62 pre-diffuses the light from the LEDs 33 before that light reaches the planar prismatic diffuser 60. The pre-diffused light is further diffused as it passes the planar prismatic diffuser 60. The result is a complete diffusion of light that makes the appearance of the LEDs 33 on the circuit board substrates 31 indistinguishable from the appearance of traditional fluorescent tubes.

Figure 5:
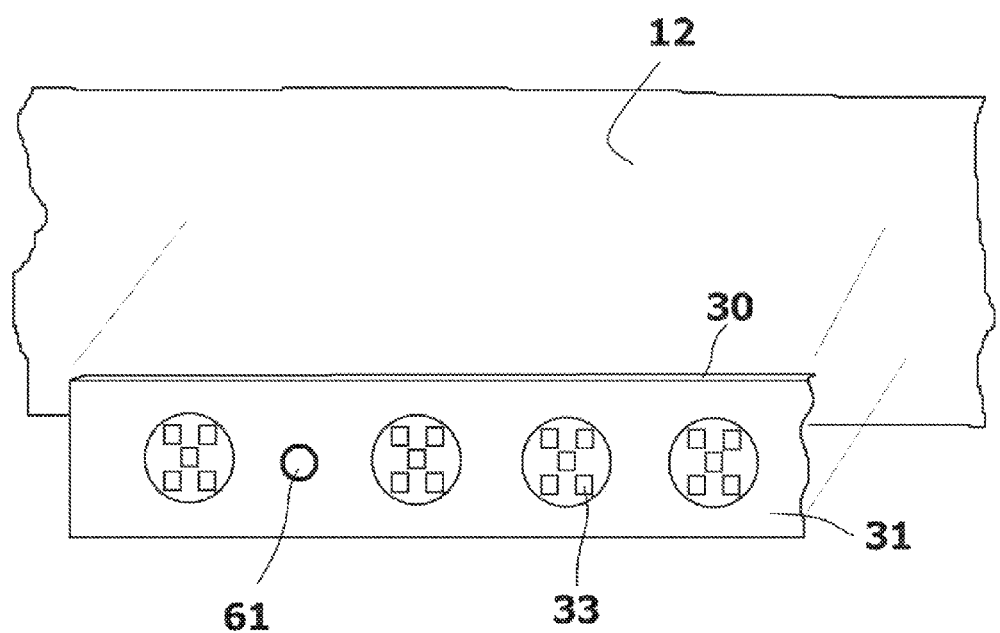
FIG. 5 is a fragmented view showing a first embodiment of a circuit board assembly mounted to the troffer.

As has been previously mentioned, the circuit board substrates 31 attach to the sheet metal of the troffer 12 in a manner that enables heat generated by the LEDs to be dissipated by the structure of the troffer 12. Referring to FIG. 5, it can be seen that the circuit board substrates 31 of each of the circuit board assemblies 30 is fitted with magnetic elements 61 that are strong enough to affix the circuit board assemblies 30 to the sheet metal of the troffer 12 with magnetic force. The magnetic elements 61 are disposed on the circuit board substrates 31 so that the circuit board substrates 31 abut directly against the troffer 12 when magnetically attached to the troffer 12. This enables heat to transfer from the circuit board substrates 31 directly to the troffer 12.

Figure 6:
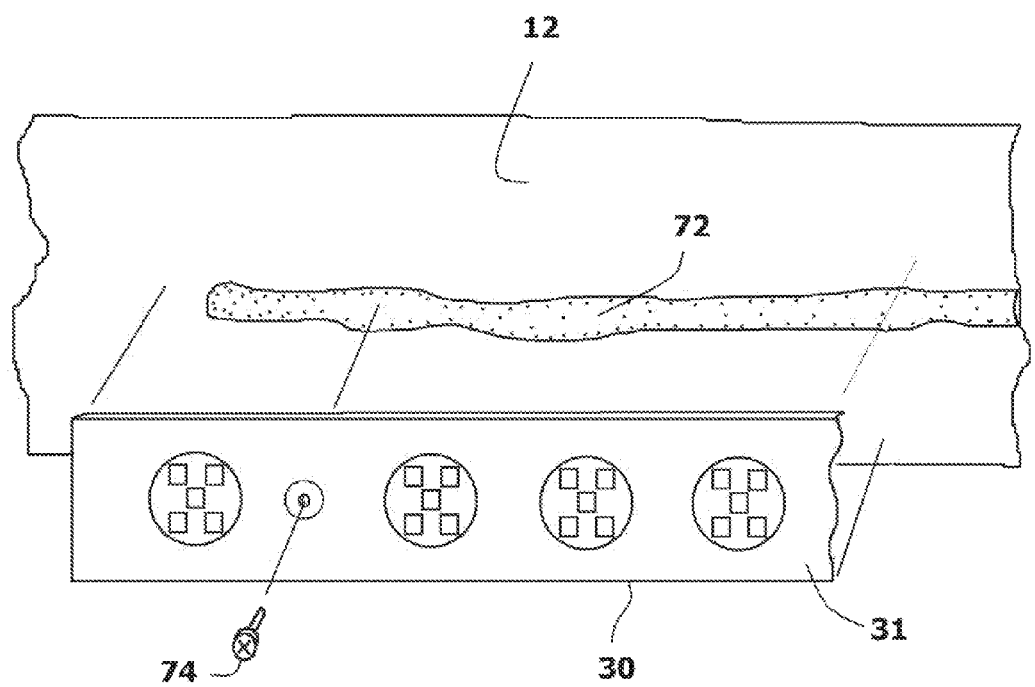
FIG. 6 is a fragmented view showing a second embodiment of a circuit board assembly mounted to the troffer.

Referring to FIG. 6, an alternate connector is shown in the form of a thermally conducive adhesive 72 and sheet metal screws 74 that are used to connect the circuit board assemblies 30 to the sheet metal of the troffer 12. The sheet metal screws 74 can be used alone. However, to ensure good thermal conductivity between the circuit board substrates 31 and the troffer 12, a thermally conductive adhesive, in the form of an epoxy or paste, is applied to the bottom of the circuit board substrates 31. Many thermally conductive adhesives are commercially available. The screws 74 can retain the circuit board assemblies 30 in place while the adhesive cures.

With reference to all figures, it will now be understood that the methodology of converting a preinstalled fluorescent light fixture to an LED light fixture involves the following steps. Step one, disconnect power from the fixture 10 and remove any face panel or diffusion panel. Step two, remove the fluorescent tube lights 24 and optionally remove the power supply 16 from the light fixture 10 if it is in the way. Step three, install the new LED power supply 28 and the connector board 40. Step four, connect circuit board assemblies 30 directly to the metal of the troffer 12 so that heat can be exchanged between these components. Step five, connect the LED power supply 28 to the circuit board assemblies 30 via the connector board 40 and flexible wiring cables 46. Lastly, if the light fixture 10 has exposed fluorescent tubes, place semi-tubular diffusers 49 on the circuit board assemblies 30. If the light fixture 10 does not have exposed fluorescent tubes, then the diffuser panel 60 is reinforced with a supplemental diffuser panel 62. The conversion is simple and requires nothing more than a screwdriver to remove the old power supply 16 and replace it with the new LED power supply 28. Furthermore, aside from the simplicity of installation, the use of parts is minimized. No auxiliary heat sink is used. Rather, the existing metal of the troffer 12 is used as the heat sink. Since no auxiliary heat sink is needed, no heat sink need be manufactured and/or installed. The result is a system that is both inexpensive to manufacture and easy to install.

The cost and labor advantages also extend to repairs. If any circuit board assembly 30 were to fail once installed, a repair can be rapidly made without the use of any tools. A replacement circuit board assembly can simply be adhered to the bottom surface 14 of the troffer 12 adjacent the failed circuit board assembly. The flexible wiring cables 46 are then simply moved from the failed circuit board assembly to the replacement circuit board assembly. The failed circuit board assembly can be left in place. Accordingly, a broken light fixture can be repaired with only a small effort of labor.

The ability to connect circuit board assemblies 30 directly to the sheet metal of a troffer 12, also enables a user to customize the light emitted by a particular light fixture. Any plurality of circuit board assemblies 30 can be connected to the troffer 12, provided there is space available. Accordingly, the light fixture can be made as bright or as dim as desired. Through the power supply 28, dimming of the LEDs 33 becomes possible using a dimmer switch or other dimmer control. Such control cannot be readily achieved with fluorescent tubes. Furthermore, circuit board assemblies with colored LEDs can be added to a light fixture to tint or soften the light being emitted.

Ceiling light fixtures that hold fluorescent tube lights typically hold either two tube lights or four tube lights. This produces either two or four strips of light when the tube lights are on and are viewed through a diffuser. It should be understood that the present invention can mimic the same look by using either two or four circuit board assemblies 30 in the lighting fixture.

It will be understood that the embodiment of the present invention that is illustrated and described is merely exemplary and that a person skilled in the art can make many variations to that embodiment. For instance, the length and number of circuit board assemblies 30 can be varied, as can the number and type of LEDs 33 on any circuit board assembly 30. All such embodiments are intended to be included within the scope of the present invention as defined by the claims.

What is claimed is:

1. A light fixture, comprising:
   a metal troffer having an interior surface;
   a circuit board substrate having a forward surface disposed between two long side edges, said circuit board being affixed to said interior surface of said metal troffer, wherein said metal troffer serves as a heat sink for said circuit board substrate;
   a plurality of light emitting diodes mounted on said forward surface of said circuit board substrate;
   a semi-tubular diffuser positioned over said circuit board substrate, wherein said semi-tubular diffuser covers said plurality of light emitting diodes on said circuit board substrate and diffuses light produced by said plurality of light emitting diodes.

2. The assembly according to claim 1, wherein said semi-tubular diffuser is a single piece unit that covers all of said plurality of light emitting diodes on said circuit board substrate.

3. The assembly according to claim 1, wherein said semi-tubular diffuser mounts directly to said circuit board substrate.

4. The assembly according to claim 1, wherein said semi-tubular diffuser contains grooves that receive said long side edges of said circuit board substrate.

5. The assembly according to claim 1, wherein said light emitting diodes extends across a first range of said circuit board substrate and said semi-tubular diffuser is at least as long as said first range.

6. The assembly according to claim 1, further including a connector for connecting said circuit board substrate to said interior surface of said troffer, wherein said connector is selected from a group consisting of magnets, screws and adhesives.

7. The assembly according to claim 1, further including magnets mounted to said circuit board substrate that enable said circuit board substrate to magnetically attach to said interior surface of said troffer.

8. A light fixture, comprising:
a metal troffer having an interior surface;
a circuit board substrate having a forward surface disposed between two long side edges, said circuit board being affixed directly to said interior surface of said metal troffer, wherein said metal troffer serves as a heat sink for said circuit board substrate;
a plurality of light emitting diodes mounted on said forward surface of said circuit board substrate;
a primary diffuser panel that is supported by said troffer, wherein said primary diffuser covers said plurality of light emitting diodes on said circuit board substrate and diffuses light produced by said plurality of light emitting diodes.

9. The assembly according to claim 8, wherein said primary diffuser panel is a prismatic panel.

10. The assembly according to claim 8, wherein a secondary diffuser panel is placed against said primary diffuser panel.

11. The assembly according to claim 10, wherein said secondary diffuser panel is a lenticular panel.

12. The assembly according to claim 8, further including a connector for connecting said circuit board substrate to said interior surface of said troffer, wherein said connector is selected from a group consisting of magnets, screws and adhesives.

13. The assembly according to claim 8, further including magnets mounted to said circuit board substrate that enable said circuit board substrate to magnetically attach to said interior surface of said troffer.

14. A light fixture, comprising:
a metal troffer having an interior surface;
a circuit board substrate having a forward surface, said circuit board being affixed to said interior surface of said metal troffer, wherein said metal troffer serves as a primary heat sink for said circuit board substrate;
a plurality of light emitting diodes mounted on said forward surface of said circuit board substrate;
at least one diffuser that covers said plurality of light emitting diodes on said circuit board substrate and diffuses light produced by said plurality of light emitting diodes.

15. The assembly according to claim 14, wherein said at least one diffuser is supported by said troffer.

16. The assembly according to claim 15, wherein said at least one diffuser includes a primary diffuser and a secondary diffuser.

17. The assembly according to claim 16, wherein said primary diffuser is a prismatic.

18. The assembly according to claim 17, wherein said secondary diffuser is lenticular.

19. The assembly according to claim 14, wherein said at least one diffuser is attached to said circuit board substrate.

* * * * *